United States Patent
Ishitsuka

(10) Patent No.: US 6,307,698 B1
(45) Date of Patent: Oct. 23, 2001

(54) MAGNETIC TAPE READ APPARATUS AND ERROR IDENTIFICATION METHOD

(75) Inventor: Tadashi Ishitsuka, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/368,885

(22) Filed: Aug. 5, 1999

(30) Foreign Application Priority Data

Sep. 18, 1998 (JP) .................................................. 10-264813

(51) Int. Cl.[7] ....................................................... G11B 5/09
(52) U.S. Cl. .................................................. 360/53; 360/46
(58) Field of Search .................................. 360/46, 25, 50, 360/53, 31, 67

(56) References Cited

U.S. PATENT DOCUMENTS 5,398,140 * 3/1995 Rhodes et al. ......................... 360/48
5,455,720 * 10/1995 Norton .................................... 360/46

FOREIGN PATENT DOCUMENTS 4-310606   11/1992 (JP) .................................. G11B/5/09

* cited by examiner

*Primary Examiner*—Regina Y. Neal
(74) *Attorney, Agent, or Firm*—Hayes, Soloway, Hennessey, Grossman & Hage PC

(57) ABSTRACT

An amplitude comparator compares to one another amplitudes of data items, which have been read by read heads and amplified by amplifiers. An error identification circuit detects a read level lowering in the read heads according to the result of the comparison. A signal processor references the detection result of the error identification circuit if a read error is detected. If any of the read units has a lowered read level, the cause of the read error is determined to be in that read unit. If none of the read heads has a lowered read level, it is determined that the read error has been caused by other than the read heads.

7 Claims, 1 Drawing Sheet

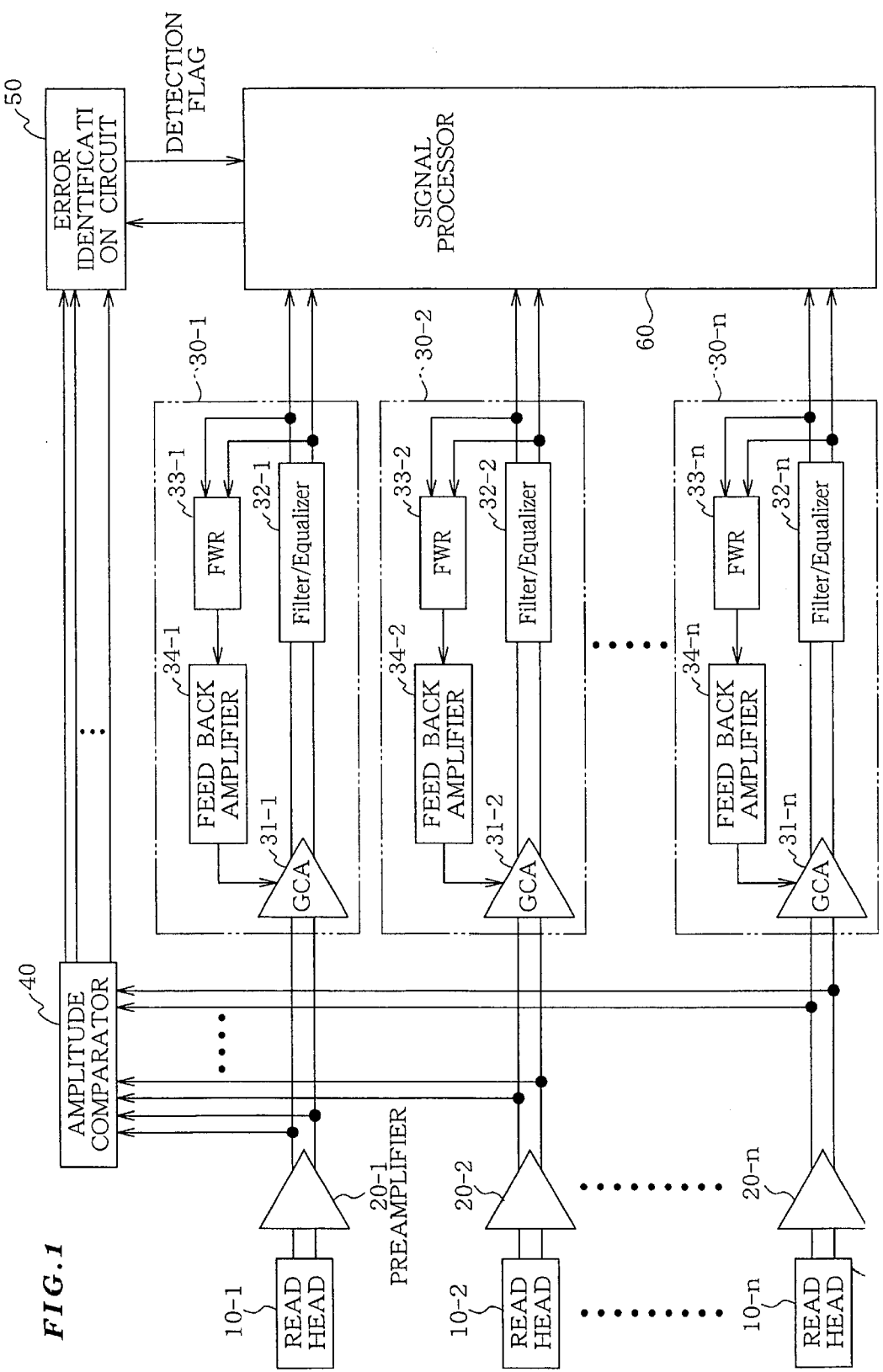

MAGNETIC TAPE READ APPARATUS AND ERROR IDENTIFICATION METHOD

BACKGROUND OF THE INVENTION

1. Field of the Invention

The present invention relates to a magnetic tape read apparatus and in particular to a magnetic tape read apparatus having a plurality of read heads as well as an error identification method.

2. Description of the Related Art

Conventionally, in a magnetic tape read apparatus, a data which has been read is amplified for processing, and according to a processed result, a read error is detected.

However, in the aforementioned conventional magnetic tape read apparatus, it is difficult to determine whether a read error has been caused by a medium quality deterioration or scratch or by a read head performance lowering or dust adhesion.

SUMMARY OF THE INVENTION

It is therefore an object of the present invention to provide a magnetic tape read apparatus capable of identifying a read error cause and an error identification method.

The magnetic tape read apparatus according to the present invention is for reading magnetic data items recorded on magnetic tapes and comprises:

a plurality of read means for reading magnetic data items from the magnetic tapes;

a plurality of amplifying means for amplifying each of the data items which have been read by the plurality of read means;

automatic gain control circuits for controlling amplitudes of the respective data items which have been amplified by the plurality of amplifying means;

comparison means for comparing the data items which have been amplified by the plurality of amplifying means;

an error identification circuit for detecting a read level lowering in the read means according to the comparison result; and a signal processor for processing the data items whose amplitudes have been controlled by the automatic gain control circuits, detecting a read error according to the processed data items, wherein if a read error is detected, the signal processor identifies a read error cause according to the detection result in the error detection circuit.

According to another aspect of the present invention, the comparison means compares to one another amplitudes of the data items which have been amplified by the plurality of amplifying means.

According to still another aspect of the present invention, when a read error is detected, the signal processor references the detection result of the error identification circuit. If any of the read means has a read level lowered, it is determined that the read error has been caused by that read means, and if no read means has a read level lowered, it is determined that the read error has been caused by other than the read means.

According to yet another aspect of the present invention, the error identification circuit outputs a detection flag signal to the signal processor if any of the read heads has a lowered read level. Upon reception of the detection flag signal, the signal processor determines that the read error has been caused by that read means having the lowered read level. Otherwise, the signal processor determines that the read error has been caused by other than the read means.

According to yet still another aspect of the present invention, there is provided an error identification method in a magnetic tape read apparatus having a plurality of read means for reading magnetic data items recorded on magnetic tapes. That is, a lowered read level of the read means is detected by comparing amplitudes of the magnetic data items which have been read by the plurality of read means. When a read error is detected, the cause of the read error is identified according to whether any of the read means has a lowered read level.

If any of the read means has a lowered read level, it is determined that the read error cause is that read means. If none of the read means has a lowered read level, it is determined that the read error has been caused by other than the plurality of the read means.

In the present invention having the aforementioned configuration, the comparison means compares to one another amplitudes of data items read from the plurality of read means and amplified by the plurality of amplifiers; the error identification circuit detects a lowered read level according to the comparison result in the comparison means; and the signal processor, upon detection of a read error, references the detection result in the error identification circuit. If any of the read means has a lowered read level, it is determined that the read error has been caused by the read means, and if no read means has a lowered read level, it is determined that the read error has been caused by other than the read means.

Thus, a read error cause is determined according to the comparison of the read levels of the read heads. Accordingly, when a read error is caused, it can be known whether the error has been caused by the medium quality deterioration including scratches or the read means performance lowering or dust adhesion.

BRIEF DESCRIPTION OF THE DRAWINGS

FIG. 1 is a block diagram showing a magnetic tape read apparatus according to an embodiment of the present invention.

DESCRIPTION OF THE PREFERRED EMBODIMENTS

Description will now be directed to an embodiment of the present invention with reference to the attached drawing.

FIG. 1 is a block diagram showing a magnetic tape read apparatus according to the embodiment of the present invention.

As shown in FIG. 1, the magnetic tape read apparatus according to the present embodiment includes: a plurality of read heads 10-1 to 10-n for reading a magnetic data from a magnetic tape; preamplifiers 20-1 to 20-n for amplifying data items read by the read head 10-1 to 10-n; automatic gain control circuits 30-1 to 30-n for controlling the data amplitudes which have been amplified by the preamplifiers 20-1 to 20-n; an amplitude comparator 40 for comparing to one another the data amplitudes which have been amplified by the preamplifiers 20-1 to 20-n; an error identification circuit 50 for detecting a read level lowering in the read heads 10-1 to 10-n according to the comparison result; and a signal processor 60 for processing the data having amplitudes controlled to be a predetermined value by the automatic gain control circuits 30-1 to 30-n and detecting a read error according to the processed data. When a read error is detected, the signal processor 60 identifies a read error cause according to the detection result of the error identification circuit 50.

It should be noted that the automatic gain control circuits 30-1 to 30-n are constituted by gain control amplifiers 31-1 to 31-n, equalizers 32-1 to 32-n, full wave rectifiers 33-1 to 33-n, and feed back amplifiers 34-1 to 34-n, respectively.

Description will now be directed to operation of the magnetic tape read apparatus having the aforementioned configuration.

Magnetic data items written in the magnetic tapes are read by the read heads 10-1 to 10-n and respectively amplified by the preamplifiers 20-1 to 20-n.

The data items amplified by the preamplifiers 20-1 to 20-n are respectively supplied to the automatic gain control circuits 30-1 to 30-n and also supplied to the amplitude comparator 40.

The data items which have been amplified by the preamplifiers 20-1 to 20-n are supplied to the automatic gain control circuits 30-1 to 30-n, where the data amplitudes are respectively controlled to a predetermined value for supply to the signal processor 60.

On the other hand, the data items amplified by the preamplifiers 20-1 to 20-n are supplied to the amplitude comparator 40, where the data amplitudes are compared to one another and the comparison result is output to the error identification circuit 50. Here, as a comparison method, an average is calculated among the data items amplified by the preamplifiers 20-1 to 20-n and the lowering amount from the average can be used for an error identification. It should be noted that the lowering amounts setting are defined experimentally and statistically.

According to the comparison result in the amplitude comparator 40, the error identification circuit 50 detects a read level lowering in the read heads 10-1 to 10-n.

Moreover, the data items having amplitudes controlled by the automatic gain control circuits 30-1 to 30-n are supplied to the signal processor 60, where the data items are processed and a read error is detected according to the processed data items.

If a read error is detected in the signal processor 60, a signal indicating presence of the read error is supplied to the error identification circuit 50.

In the error identification circuit 50, if a head with a lowered read level is present, a detection flag signal is output to the signal processor 60.

After this, in the signal processor 60, upon reception of the detection flag signal from the error identification circuit 50, it is determined that the read error cause is in the read head; and no detection flag signal is output from the error identification circuit 50, the read error cause is in other than the read head.

As has been described above, according to the present invention, the comparison means compares one to another amplitudes of the data items which have been read by the read means and amplified by amplification means. When the error identification circuit has detected a lowering of the read level of the read means according to the comparison and an error identification circuit detects a read error, the detection result in the error identification circuit is referenced. If any of the read means has a read level lowering detected, it is decided that the read error cause is in the read means. If no read means has been detected for read level lowering, the read error cause is determined to be other than the read means. Thus, when a read error is generated, the error cause can be identified as an error caused by medium quality deterioration including scratches or an error caused by read means performance lowering including dust adhesion.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. A10-264813 (Filed on Sep. 18, 1998) including specification, claims, drawings and summary are incorporated herein by reference in its entirety.

What is claimed is:

1. A magnetic tape read apparatus for reading magnetic data items recorded on magnetic tapes, the apparatus comprising:
   a plurality of read units for reading magnetic data items from the magnetic tapes;
   a plurality of amplifying units for amplifying each of the data items which have been read by the plurality of read units to increase a magnitude of each of the data items;
   automatic gain control circuits for controlling amplitudes of the respective data items which have been amplified by the plurality of amplifying units;
   a comparison unit for comparing, to one another, the data items which have been amplified by the plurality of amplifying units;
   an error identification circuit for detecting a read level lowering in a read unit according to a comparison result; and
   a signal processor for processing the data items whose amplitudes have been controlled by the automatic gain control circuits, detecting a read error according to the processed data items, wherein if a read error is detected, the signal processor identifies a read error cause according to the detection result in the error detection circuit.

2. A magnetic tape read apparatus as claimed in claim 1, wherein when a read error is detected in the signal processor, the signal processor references a detection result in the error identification circuit, and if a read unit having a read level lowered is present, the cause of the read error is determined to be in that read unit, and if no read unit having a read level lowered is found, the cause of the read error is determined to be other than the plurality of read units.

3. A magnetic tape read apparatus as claimed in claim 1, wherein
   the error identification circuit outputs a detection flag signal to the signal processor if any of the read units has a lowered read level;
   upon reception of the detection flag signal, the signal processor determines that the read error is caused by the read unit whose read level has been lowered, and if no detection flag signal is received from the error identification circuit, the signal processor determines that the read error had been caused by other than the plurality of read units.

4. A magnetic tape read apparatus as claimed in claim 1, wherein
   the error identification circuit outputs a detection flag signal to the signal processor if any of the read heads has a lowered read level;

upon reception of the detection flag signal, the signal processor determines that the read error is caused by a read unit whose read level has been lowered, and if no detection flag signal is received from the error identification circuit, the signal processor determines that the read error has been caused by other than the plurality of read units.

5. An error identification method for a magnetic tape read apparatus having a plurality of read units for reading magnetic data items recorded on magnetic tapes, and a plurality of amplifying units for amplifying each of the data items which have been read by the plurality of read units to increase a magnitude of each of the data items, wherein amplitudes of the magnetic data items read by the plurality of read units are compared to one another, so as to detect a read level lowering in the read units, and if a read error is detected, a cause of the read error is determined depending on whether any read unit has a lowered read level.

6. An error identification method as claimed in claim 5, wherein if a read unit has a lowered read level, it is determined that the read error is caused by that read unit, and if no read level lowering is detected, it is determined that the read error is caused by other than the plurality of read units.

7. A magnetic tape read apparatus for reading magnetic data items recorded on magnetic tapes, the apparatus comprising:

a plurality of read means for reading magnetic data items from the magnetic tapes;

a plurality of amplifying means for amplifying each of the data items which have been read by the plurality of read means to increase a magnitude of each of the data items;

automatic gain control circuits for controlling amplitudes of the respective data items which have been amplified by the plurality of amplifying means;

comparison means for comparing, to one another, the data items which have been amplified by the plurality of amplifying means;

an error identification circuit for detecting a read level lowering in a read means according to the comparison result of the comparison means; and a signal processor for processing data items whose amplitudes have been controlled by the automatic gain control circuits, detecting a read error according to the processed data items, wherein if a read error is detected, the signal processor identifies a read error cause according to the detection result in the error detection circuit.

* * * * *